United States Patent
Hessling-von Heimendahl et al.

(10) Patent No.: US 12,043,412 B2
(45) Date of Patent: Jul. 23, 2024

(54) AIRCRAFT BEACON LIGHT, AIRCRAFT COMPRISING AN AIRCRAFT BEACON LIGHT, AND METHOD OF DETERMINING A HEALTH STATUS OF AN AIRCRAFT BEACON LIGHT

(71) Applicant: Goodrich Lighting Systems GmbH & Co. KG, Lippstadt (DE)

(72) Inventors: Andre Hessling-von Heimendahl, Koblenz (DE); Björn Schallenberg, Geseke (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/348,424

(22) Filed: Jul. 7, 2023

(65) Prior Publication Data

US 2024/0010353 A1    Jan. 11, 2024

(30) Foreign Application Priority Data

Jul. 7, 2022   (EP) .................................... 22183686

(51) Int. Cl.
*B64D 47/06*   (2006.01)
*B64D 45/00*   (2006.01)
(Continued)

(52) U.S. Cl.
CPC .............. *B64D 47/06* (2013.01); *F21V 5/046* (2013.01); *F21V 23/0457* (2013.01);
(Continued)

(58) Field of Classification Search
CPC ............. F21V 23/0457; F21Y 2107/30; F21Y 2105/18; B64D 47/06
See application file for complete search history.

(56) References Cited

U.S. PATENT DOCUMENTS

| | | | |
|---|---|---|---|
| 8,974,097 B2 * | 3/2015 | Hessling | H05B 45/12 362/545 |
| 10,362,657 B2 | 7/2019 | Hessling-Von Heimendahl et al. | |

(Continued)

FOREIGN PATENT DOCUMENTS

| EP | 2579682 A1 | 4/2013 |
|---|---|---|
| EP | 3095709 A1 | 11/2016 |

(Continued)

OTHER PUBLICATIONS

Extended European Search Report for Application No. 22183686.9, mailed Dec. 5, 2022, 8 pages.

*Primary Examiner* — Alexander K Garlen
(74) *Attorney, Agent, or Firm* — CANTOR COLBURN LLP

(57) ABSTRACT

An aircraft beacon light comprises an annular light source support having a plurality of light passing portions; a plurality of light sources, arranged on the annular light source support for a radially outwards emission of light flashes; a light detector for sensing a light output level of at least a subset of the plurality of light sources; and at least one optical element for shaping a beacon light output from light emitted by the plurality of light sources, the at least one optical element having at least one light guiding portion for capturing stray light from at least said subset of the plurality of light sources and for guiding said stray light through the plurality of light passing portions and towards the light detector.

12 Claims, 7 Drawing Sheets

(51) Int. Cl.
*F21V 5/04* (2006.01)
*F21V 23/04* (2006.01)
*F21W 107/30* (2018.01)
*F21Y 105/18* (2016.01)
*F21Y 115/10* (2016.01)

(52) U.S. Cl.
CPC .. *B64D 2045/0085* (2013.01); *B64D 2203/00* (2013.01); *F21W 2107/30* (2018.01); *F21Y 2105/18* (2016.08); *F21Y 2115/10* (2016.08)

(56) References Cited

U.S. PATENT DOCUMENTS

| | | | |
|---|---|---|---|
| 11,006,500 B1 | 5/2021 | Edquist et al. | |
| 11,077,959 B2 | 8/2021 | Jha | |
| 2008/0093530 A1* | 4/2008 | Hoelen | G01J 3/505 |
| | | | 257/E33.076 |
| 2009/0212709 A1* | 8/2009 | Meijer | F21S 10/02 |
| | | | 315/153 |
| 2016/0282283 A1* | 9/2016 | Hessling-Von Heimendahl | G01N 21/47 |
| 2017/0181246 A1* | 6/2017 | Hessling-Von Heimendahl | B64D 47/02 |
| 2018/0084620 A1* | 3/2018 | Klein | H05B 47/28 |
| 2019/0144132 A1* | 5/2019 | Jha | H05K 1/181 |
| | | | 362/470 |
| 2019/0359348 A1* | 11/2019 | Pawliczek | B64D 47/04 |
| 2020/0189766 A1* | 6/2020 | Jha | G08G 5/045 |
| 2021/0122494 A1* | 4/2021 | Hessling-Von Heimendahl | H05B 47/20 |

FOREIGN PATENT DOCUMENTS

| | | |
|---|---|---|
| EP | 4082918 A1 | 11/2022 |
| WO | 0027699 A2 | 5/2000 |

* cited by examiner

AIRCRAFT BEACON LIGHT, AIRCRAFT COMPRISING AN AIRCRAFT BEACON LIGHT, AND METHOD OF DETERMINING A HEALTH STATUS OF AN AIRCRAFT BEACON LIGHT

CROSS REFERENCE TO RELATED APPLICATION

This application claims priority to European Patent Application No. 22183686.9 filed Jul. 7, 2022, the entire contents of which is incorporated herein by reference.

TECHNICAL FIELD

The present invention is in the field of exterior aircraft lights. The present invention is in particular related to an aircraft beacon light, to an aircraft comprising such an aircraft beacon light, and to a method of determining a health status of an aircraft beacon light.

BACKGROUND

Almost all aircraft have exterior aircraft lights. In particular, large passenger air planes are equipped with a wide variety of exterior aircraft lights. Examples of such exterior aircraft lights include take-off and/or landing lights, taxi lights, navigation lights and anti-collision lights.

The term "anti-collision light" is a generic term, which encompasses white flashing strobe lights, typically mounted at the wing tips and the tail of an aircraft, and red flashing aircraft beacon lights, usually mounted above and below the fuselage of an aircraft.

Aircraft beacon lights typically comprise a large number of light sources aiming in different directions for generating a circumferential light distribution. Any failure of light sources leaves a gap in the circumferential light distribution emitted by the aircraft beacon light. As a result, the aircraft beacon light may no longer comply with aircraft safety regulations. The emission characteristics of red LEDs, which are often employed as light sources in aircraft beacon lights, are highly dependent on ambient temperatures and aging. Thus, it is desirable to closely monitor the light emission of the light sources of aircraft beacon lights.

Accordingly, it would be beneficial to provide an aircraft beacon light and a method of determining a health status of an aircraft beacon light, which allow for reliably monitoring the operation of an aircraft beacon light.

SUMMARY

Exemplary embodiments of the invention include an aircraft beacon light comprising an annular light source support having a plurality of light passing portions; a plurality of light sources, arranged on the annular light source support for a radially outwards emission of light flashes; a light detector for sensing a light output level of at least a subset of the plurality of light sources; and at least one optical element for shaping a beacon light output from light emitted by the plurality of light sources, the at least one optical element having at least one light guiding portion for capturing stray light from at least said subset of the plurality of light sources and for guiding said stray light through the plurality of light passing portions and towards the light detector.

The plurality of light sources are arranged around the annular light source support, such that they emit a beacon light output which is directed generally radially outwards. The radially outwards light emission comprises light emission not only in the one "radial" direction, as geometrically defined, but into a wider angle around the geometric "radial" direction, satisfying the requirements for aircraft beacon lights, at least for one hemisphere. In particular, the aircraft beacon light may be configured to satisfy the requirements of Federal Aviation Regulations (FAR) section 25.1401, as in force on the day of filing of the present application, for at least one hemisphere. The plurality of light sources may be a plurality of LEDs which emit red light flashes in operation. The term "stray light" refers to light emitted by at least a subset of the plurality of light sources in directions that are not relevant for the beacon light output, such as downwards, i.e. towards an aircraft fuselage, in particular in directions of between −45° and −90° with respect to a main light emission direction/with respect to a horizontal plane through the plurality of light sources.

The light sources and the light source support may be arranged in an annular configuration for emitting light in a wide range of spatial directions, in particular for emitting light into a set of directions which, when projected onto a horizontal plane, cover an angle of 360° around the aircraft beacon light. The annular light source support may have a cylindrical configuration, the light source support may in particular embodied as a hollow cylinder, with the plurality of light sources being arranged on the outer surface of the hollow cylinder. The annular light source support may also have an equiangular polygonal configuration, such as a hexagonal or octagonal arrangement. In such a configuration, a light source may be arranged at a center of each of the sides of the polygonal configuration.

In an aircraft beacon light according to an exemplary embodiment of the invention, a single light detector may be sufficient for monitoring a health status of all light sources individually or in combination. Since only a single light detector is employed for monitoring the health status of a large number of light sources, as are usually employed in an aircraft beacon light, an aircraft beacon light according to an exemplary embodiment of the invention may be provided at comparatively low complexity and cost.

The annular light source support has a plurality of light passing portions. The light passing portions extend through the annular light source support. I.e., the stray light, after being captured by the at least one light guiding portion, is passed through the annular light source support. With said passing of stray light through the annular light source support, a high measurement accuracy and, thus, a high reliability in monitoring the health status of the aircraft beacon light may be achieved. The light passing portions may act as a light filter for ambient light and may, thus, pass the stray light from the plurality of light sources with particularly low interference from other, external light sources. The light passing portions may allow for passing on the stray light with low interference, while enabling a compact implementation of the monitoring functionality. The stray light may be directed towards the light detector in a very direct manner through the annular light source support.

According to an embodiment, the at least one optical element has a total internal reflection portion, directing a portion of the light output of the plurality of light sources towards the plurality of light passing portions. The at least one optical element may be one annular element or multiple elements, such as sections of a ring or straight elements. The stray light, which is directed to the light detector, is a portion of the light that experiences total internal reflection.

According to an embodiment, the aircraft beacon light further comprises a light redirecting element for redirecting the stray light from the plurality of light passing portions to the light detector. Alternatively, the light detector may be arranged and/or shaped in an inner space, formed by the annular light source support, so as for the stray light, passing through the light passing portions, to directly hit the light detector.

According to an embodiment, the at least one optical element is a lens structure, in particular a unitary lens structure encasing the plurality of light sources. The lens structure encasing the plurality of light sources means that the lens structure completely surrounds the plurality of light sources and does not form a gap between the lens structure and the plurality of light sources. In this way, a tight encasing of the light sources may be ensured by the at least one optical element. A strong mechanical protection of the light sources may be achieved.

According to an embodiment, the at least one optical element and/or at least part of the light redirecting element are formed in a joint molding operation, wherein the at least one optical element and/or at least part of the light redirecting are in particular made from overmolded silicone. In this way, the at least one optical element and/or the at least part of the light redirecting element may be brought into the desired shape in a single molding operation, thus allowing for efficient production thereof.

According to an embodiment, the plurality of light passing portions have one-to-one correspondence with the plurality of light sources, i.e. one light passing portion may be provided for each of the plurality of light sources. The plurality of light passing portions may be arranged around the annular light source support, such that stray light from each of the plurality of light sources passes through a corresponding light passing portion. In this way, stray light from the plurality of light sources may converge in a center portion of the annular light source support. Alternatively, the number of light passing portions may be less than that of the light sources, such that stray light from every second or every third light source, for example, can pass through a corresponding light passing portion.

According to an embodiment, each of the plurality of light passing portions comprises a plurality of through holes through the annular light source support. In an embodiment, the annular light source support comprises at least one printed circuit board (PCB) and the plurality of through holes are vias through the at least one printed circuit board. In an embodiment, the plurality of through holes each have a diameter of less than 0.5 mm, in particular a diameter of between 0.2 mm and 0.4 mm. This configuration is very well suited for passing the stray light through the annular light source support, but blocking ambient light, which does usually not come straight into the vias. The vias are very well suited to form a light filter for the redirected stray light. Also, the vias, which may also be referred to as VIAS, Vertical Interconnect Access through holes, in the field of printed circuit boards, are structures that are readily available on many printed circuit boards and that, therefore, do not required an extra production step. The vias further provide an additional benefit while manufacturing the aircraft beacon light, when using a silicone overmolding process. Due to the capillary effect of the through holes having a diameter of between 0.2 mm and 0.4 mm, the silicone overmolding may naturally stop at the inner end of the vias, filling the vias with silicone, without the silicone seeping into the inner space of the annular light source support.

It is herewith stressed and explicitly disclosed that the use of vias of a printed circuit board for guiding stray light to a light detector is considered its own invention in the field of aircraft lights, irrespective of the implementation of the aircraft light as an aircraft beacon light and irrespective of the number of light sources involved. In any kind of aircraft light, the effects described herein with respect to the light guiding properties of the vias of a printed circuit board may be made use of in a beneficial manner. Broadly stated, the following is considered an invention by the inventors of the present application: an aircraft light comprising: a light source support structure, which comprises a printed circuit board, the printed circuit board having a plurality of vias therethrough; at least one light source, arranged on a first side of the printed circuit board; a light detector for sensing a light output level of at least a subset of the at least one light source, the light detector being arranged on a second side of the printed circuit board; and at least one optical element for shaping an aircraft light output from light emitted by the at least one light source, the at least one optical element having at least one light guiding portion for capturing stray light from at least said subset of the at least one light source and for guiding said stray light through the plurality of vias and towards the light detector. The additional features, modification, and effects, as described herein with respect to the aircraft beacon light, apply to the other kinds of aircraft lights in an analogous manner.

Turning back to the aircraft beacon light, according to an embodiment, each of the plurality of light passing portions comprises a single through hole, in particular a single through hole having a diameter greater than 0.5 mm. A plurality of single through holes may be arranged around the annular light source support, such that stray light from each of the plurality of light sources may pass through a corresponding single through hole, so that stray light from the plurality of light sources may converge in a center portion of the annular light source support. Each single through hole may have a diameter smaller than 5.0 mm, in particular smaller than 2.0 mm. The total number of the through holes may be less than the total number of the light sources.

According to an embodiment, the plurality of light passing portions may be filled with a filler material, such as silicone. Also, the filler material of the light passing portions may be integrally formed with the at least one optical element by the silicone overmolding process.

According to an embodiment, the aircraft beacon light further comprises a housing with a base plate having a center hole; wherein the annular light source support extends from the base plate; wherein the light detector is arranged within the housing; and wherein the light redirecting element is configured to guide said stray light through the center hole of the base plate and to the light detector. In this way, a light output level of the plurality of light sources may be detected by a single light detector with little or without interference by ambient light. The annular light source support may extend substantially orthogonal from the base plate, on an opposite side, as compared to the light detector.

According to an embodiment, the light redirecting element is configured to effect a redirection by between 80° and 100° for guiding the stray light through the center hole of the cover plate. The light redirecting element may comprise a first light redirecting surface for redirecting the stray light from the light passing portions by between 80° and 100° for passing through the center hole of the cover plate.

According to an embodiment, the light detector is arranged on a circuit board placed inside the housing and the light guiding structure is configured to effect a second redirection by between 80° and 100° for guiding the stray light to the light detector. The light redirecting element may further comprise a second light redirecting surface for redirecting the stray light, passing through the center hole, by between 80° and 100° to the light detector.

According to an embodiment, the aircraft beacon light further comprises a controller configured to control an operation of the plurality of light sources and to evaluate sensor measurement outputs, i.e. light output levels, provided by the light detector to determine a health status of the aircraft beacon light.

Exemplary embodiments of the invention further include an aircraft comprising at least one aircraft beacon light according to an exemplary embodiment of the invention. The aircraft may be an air plane or a rotorcraft, such as a helicopter. The aircraft may in particular comprise a first aircraft beacon light, which is arranged on a top portion of the aircraft, in particular on a top portion of the fuselage of the aircraft, and a second aircraft beacon light, which is arranged on a bottom portion of the aircraft, in particular on a bottom portion of the fuselage of the aircraft. The additional features, modifications, and effects, as described above with respect to the aircraft beacon light, apply to the aircraft in an analogous manner.

Exemplary embodiments of the invention further include a method of determining a health status of an aircraft beacon light, the aircraft beacon light comprising a plurality of light sources arranged on an annular light source support, the method comprising: repeatedly emitting beacon light flashes from the plurality of light sources and determining respective light output levels for the beacon light flashes from stray light guided through the annular light source support and to a light detector; and, on the basis of the light output levels over time, determining an aging status of the plurality of light sources. In an embodiment, the light output levels may be stored in a memory over time and may be compared with a threshold value, which may be a certain percentage of a reference value. Based on the comparison, i.e. in a situation where the light output level is below the threshold value, it may be determined that the light sources need to be replaced with new ones or that the aircraft beacon light as a whole needs to be replaced. The evaluation may be made for an individual light source/for various individual light sources, for a subset of the plurality of light sources/for various subsets of the plurality of light sources, or for the entirety of the plurality of light sources. For example, each of the light sources may be turned on individually or may be turned on as part of a subset of the light sources or may be turned on as part of the entirety of the light sources over time for the evaluation purpose. Based upon the light output levels detected by the light detector, an aging status of the individual light source, of the subset of the light sources or of the entirety of the light sources may be determined, respectively. The additional features, modifications, and effects, as described above with respect to the aircraft beacon light, apply to the method of determining a health status of an aircraft beacon light in an analogous manner.

BRIEF DESCRIPTION OF THE DRAWINGS

Further exemplary embodiments of the invention are described below with respect to the accompanying drawings, wherein.

DETAILED DESCRIPTION

Figure 1:
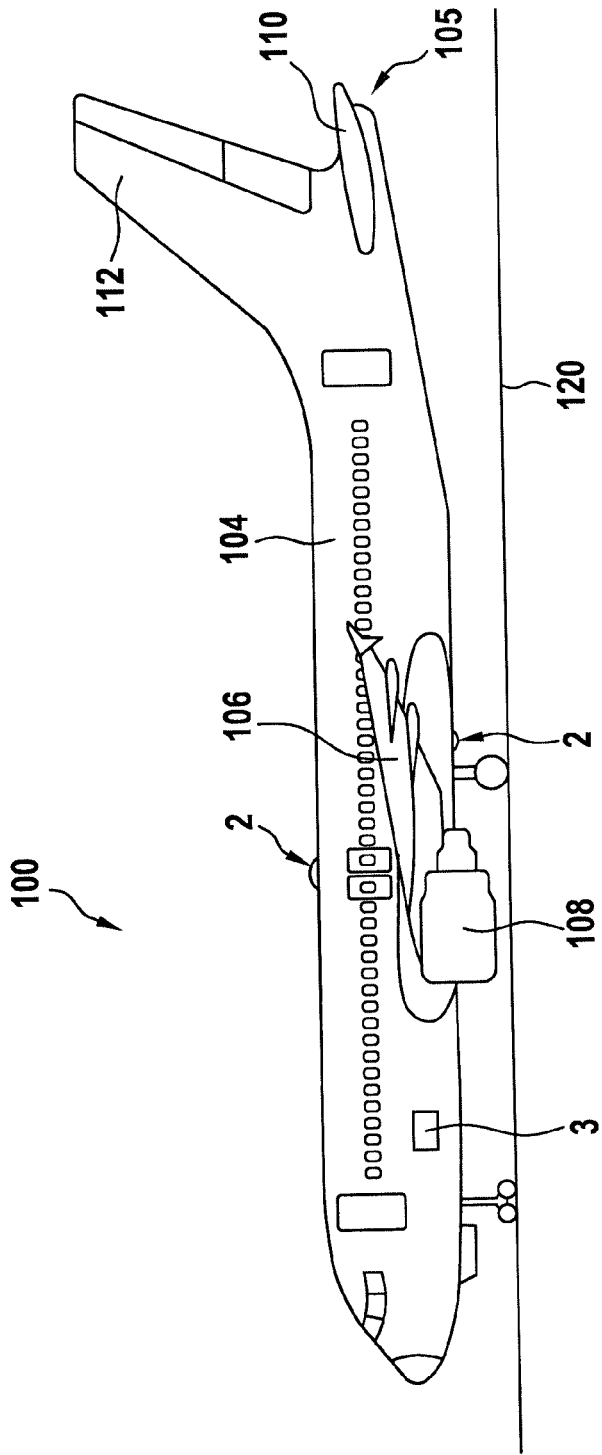
FIG. 1 depicts a schematic side view of an air plane in accordance with an exemplary embodiment of the invention, which is equipped with two aircraft beacon lights according to exemplary embodiments of the invention.

FIG. 1 depicts a schematic side view of an aircraft 100 in accordance with an exemplary embodiment of the invention, which is equipped with two aircraft beacon lights 2 according to exemplary embodiments of the invention.

The aircraft 100 has a fuselage 104 and two wings 106, which are attached to the right and left sides of the fuselage 104. Each of the wings 106 carries an engine 108. Further, two horizontal stabilizers 110 and a vertical stabilizer 112 are mounted to a tail portion of the fuselage 104. In the schematic side view depicted in FIG. 1, only one of the two wings 106, only one of the two engines 108 and only one of the two horizontal stabilizers 110 is visible, respectively. It is pointed out that aircraft in accordance with other designs and constructions are encompassed by exemplary embodiments of the present invention as well.

The aircraft 100 further comprises two aircraft beacon lights 2, mounted to the fuselage 104. An upper aircraft beacon light 2 is mounted to a top portion (roof) of the fuselage 104. A lower aircraft beacon light 2 is mounted to a bottom portion (belly) of the fuselage 104. The aircraft 100 also comprises an aircraft power supply 3 for supplying electric power to electric consumers within the aircraft 100, in particular to the aircraft beacon lights 2.

The aircraft 100 shown in FIG. 1 is an air plane 100, in particular a large passenger or cargo air plane 100. It is pointed out that other types of aircraft, such as smaller air planes 100, may be equipped with aircraft beacon lights 2 in accordance with exemplary embodiments of the invention as well.

Figure 2:
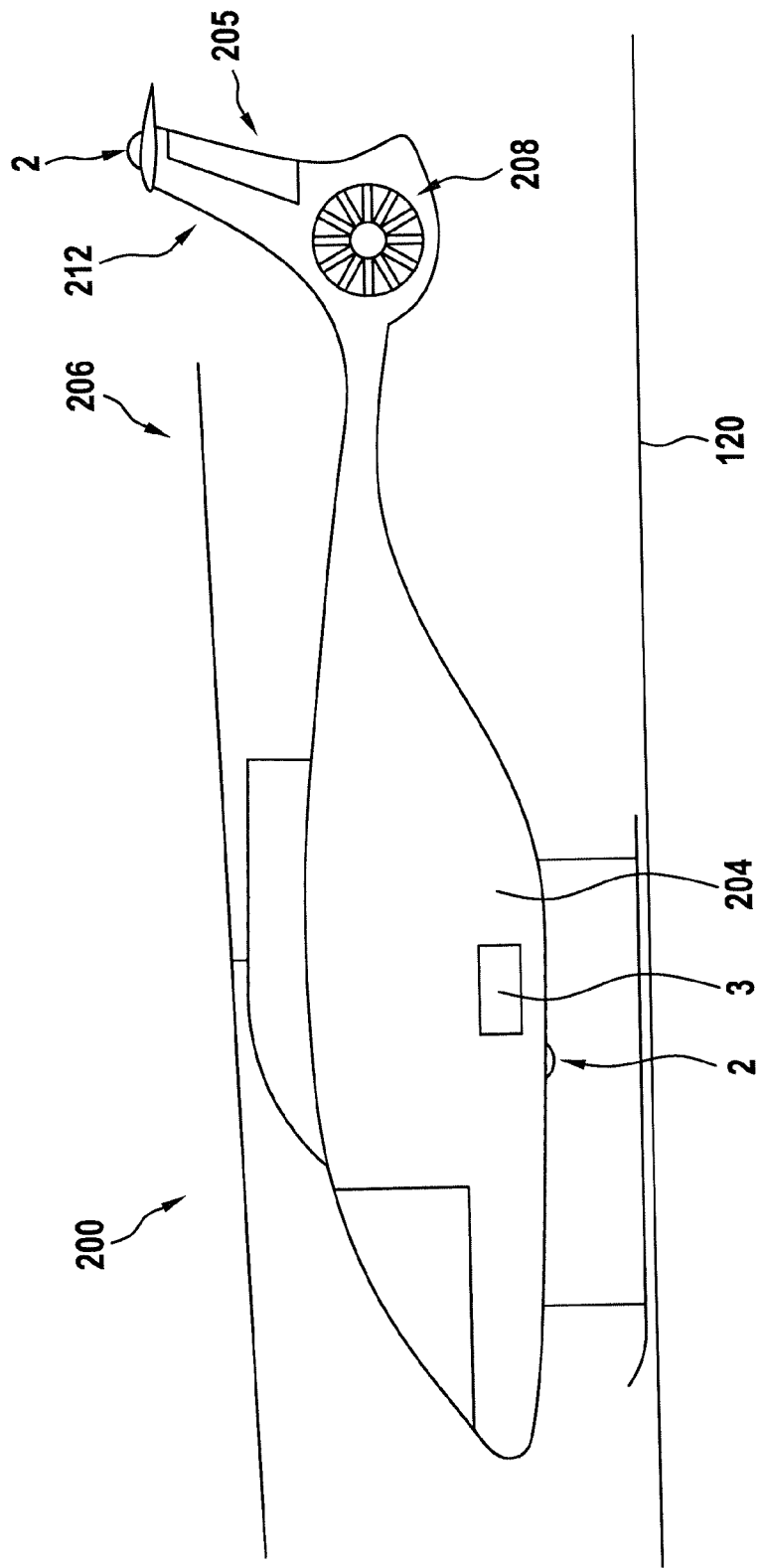
FIG. 2 depicts a schematic side view of a rotorcraft in accordance with an exemplary embodiment of the invention, which is equipped with two aircraft beacon lights according to exemplary embodiments of the invention.

FIG. 2 shows a schematic side view of another aircraft 200, in particular of a rotorcraft (helicopter) 200, having a fuselage 204 and two rotors 206, 208.

A lower aircraft beacon light 2 according to an exemplary embodiment of the invention is mounted to a bottom portion (belly) of the fuselage 204. An upper aircraft beacon light 2 is mounted to the top of a vertical stabilizer 212 at the tail 205 of the rotorcraft 200. The aircraft 200 also comprises an aircraft power supply 3 for supplying electric power to electric consumers within the aircraft 200, in particular to the aircraft beacon lights 2.

For both the FIG. 1 and FIG. 2 embodiments, the upper and lower aircraft beacon lights 2 are configured for emitting light flashes of red light in operation, in order to provide a beacon light behavior, as it is expected by other aircraft, ground personnel and air space control. The aircraft beacon lights 2 may in particular emit light flashes of aviation red light, with the light flashes of aviation red light indicating that the engines of the aircraft are running.

Although only two aircraft beacon lights 2 are shown in FIGS. 1 and 2, respectively, an aircraft 100, 200 may comprise more than two aircraft beacon lights 2. An aircraft 100, 200 may in particular comprise various combinations of aircraft beacon lights, and at least some of the aircraft beacon lights may be mounted to the wings 106 and/or to the stabilizers 110, 112, 212 and/or to the tail 105, 205 of the aircraft 100, 200. Not all aircraft beacon lights 2 of the aircraft 100 need to be aircraft beacon lights 2 according to exemplary embodiments of the invention.

The upper and lower aircraft beacon lights 2, depicted in FIGS. 1 and 2, are formed in accordance with exemplary embodiments of the invention, the details of which will be described in the following.

Figure 3:
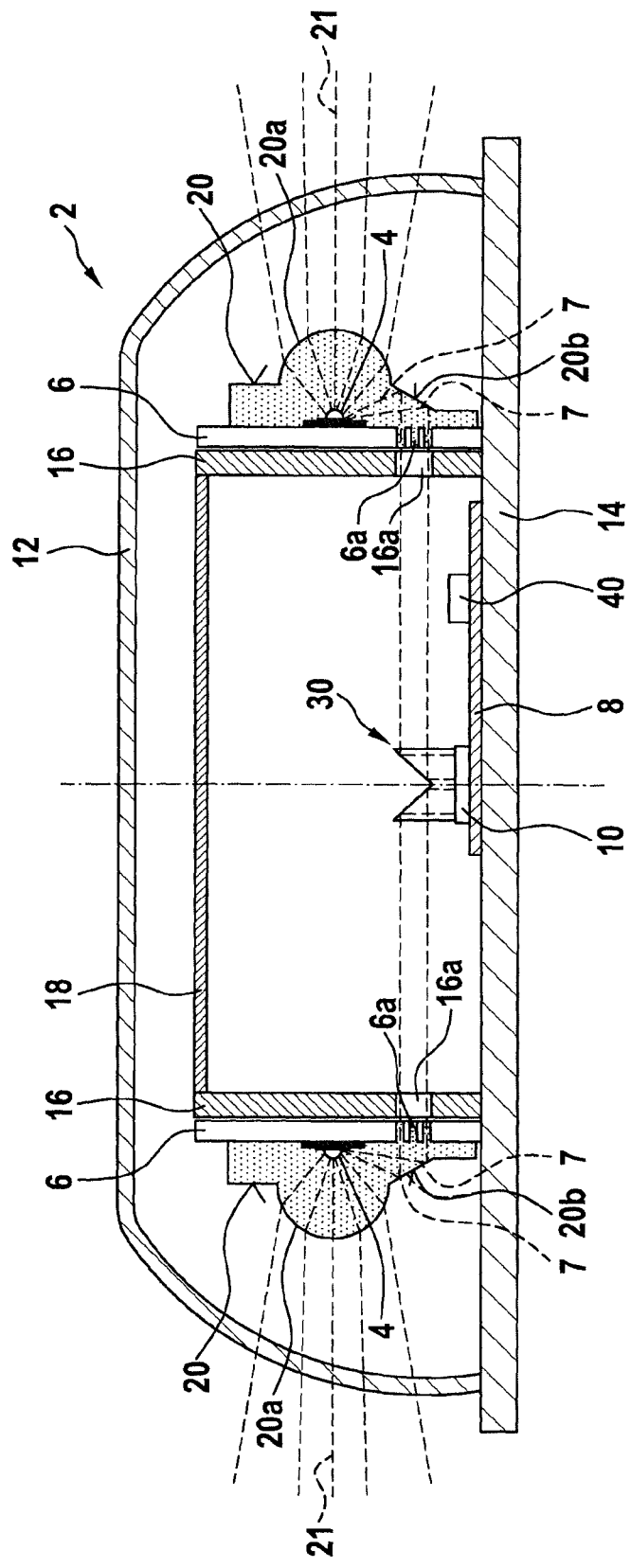
FIG. 3 depicts a cross-sectional view of an aircraft beacon light according to an exemplary embodiment of the invention.
Figure 4:
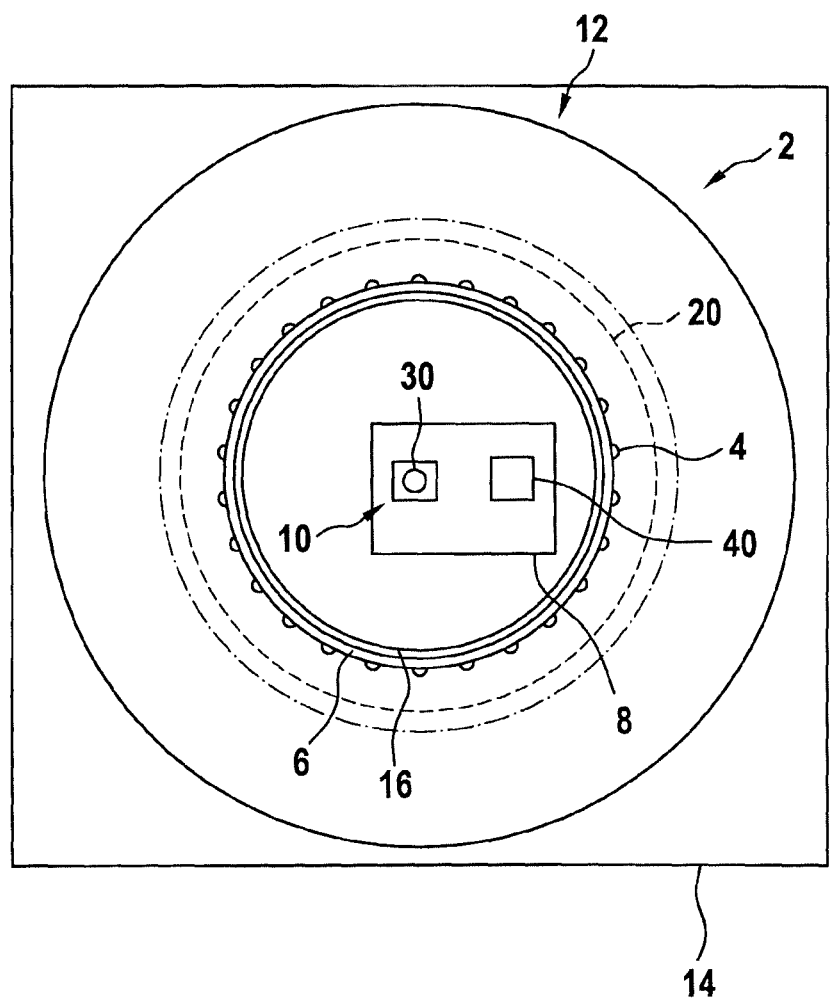
FIG. 4 depicts a top view of the aircraft beacon light depicted in FIG. 3.

FIG. 3 depicts a cross-sectional view of an aircraft beacon light 2 according to an exemplary embodiment of the invention, and FIG. 4 depicts a top view thereof. In particular, FIG. 3 depicts a vertical cross-sectional view through a center of the aircraft beacon light 2, with the cross-sectional plane extending along the longitudinal direction of the aircraft, when the aircraft beacon light 2 is mounted to the aircraft. In FIG. 4, a light detector cover 18 is omitted for ease of explanations.

The aircraft beacon light 2 comprises a plurality of light sources 4 for repeatedly emitting beacon light flashes. The light sources 4 are in particular configured for emitting red light. The light sources 4 may be or may include LEDs.

The light sources 4 are mounted to an annular light source support 6, extending orthogonal from a base plate 14. The base plate 14 may be equipped with a vertical support 16, extending therefrom for supporting the light source support 6. The vertical support 16, which is optional, may comprise a single annular plate or a plurality of plates. The light sources 4 and the light source support 6 are arranged in an annular configuration (see FIG. 4) for emitting light in all spatial directions around the aircraft, in particular for emitting light into a set of directions which, when projected onto a horizontal plane, cover an angle of 360° around the aircraft beacon light 2. The light source support 6 may have a cylindrical configuration, as shown in FIGS. 3 and 4, or an equiangular polygonal configuration, such as a hexagonal or octagonal arrangement, with a light source 4 being arranged at a center of each of the sides of the polygonal configuration.

The annular light source support 6 has a plurality of light passing portions 6a, and the optional vertical support 16 also has a plurality of openings 16a. The number of the plurality of light passing portions 6a may be equal to or less than the number of the plurality of light sources 4. In the former case, stray light from each light source 4 passes through a corresponding light passing portion 6a. In the latter case, stray light from a subset of the plurality of light sources 4 passes through corresponding light passing portions 6a. That is, one light passing portion 6a may correspond to every second or every third, etc., light source 4, for example.

The aircraft beacon light 2 further comprises an optical element 20, which is configured to shape an output light intensity distribution of the beacon light 2 from light emitted by the light sources 4. The optical element 20 is supported by the light source support 6 to be arranged over the plurality of light sources 4. In FIG. 3, the optical element 20 is a unitary lens structure encasing the light sources 4. In particular, the optical element 20 is a solid structure that fills the entire space between its outer surface, and the light source support 6 and the light sources 4.

In another embodiment not shown in Figures, the optical element 20 may consist of multiple elements such as sections of a ring or straight elements, each element being arranged over at least one light source 4.

The optical element 20 comprises a refractive outer surface portion 20a and a total internal reflection portion 20b. The latter is an example of a light guiding portion, reflecting at least a portion of stray light from the light sources 4 towards the light passing portions 6a of the light source support 6. Instead of the total internal reflection portion 20b, it is also possible for a plurality of light reflectors (not shown) to be arranged at a plurality of corresponding portions of the optical element 20, in order to guide the stray light towards the light passing portions 6a.

In an embodiment, each of the plurality of light passing portions 6a may comprise a plurality of through holes, each having a diameter of less than 0.5 mm, preferably a diameter of between 0.2 mm and 0.4 mm. Through holes having a diameter of between 0.2 mm and 0.4 mm are well suited not only for passing through stray light, coming straight from the total internal reflection portion 20b, but also for blocking ambient light which does usually not come straight into the through holes. A printed circuit board (PCB) may be used as the light source support 6, because it has a plurality of vias with a diameter of between 0.2 mm and 0.4 mm. The through holes, e.g. the vias of the PCB, with such diameter are also beneficial when forming the optical element from silicone, using a silicone overmolding process, because of the capillary effect, which will be discussed below in detail.

The aircraft beacon light 2 further comprises a light detector 10, which is configured to sense a light output level of the light sources 4 based on received stray light. The light detector 10 is arranged on a control board 8, which is surrounded by the annular light source support 6 and the vertical support 16. The control plate further comprises a controller 40 which is configured to control an operation of the plurality of light sources 4 and to evaluate the sensor measurement outputs, provided by the light detector 10, to determine a health status of the aircraft beacon light 2. The light detector may be arranged at a center portion of the annular arrangement of light sources 4. The control plate 8 is supported by the base plate 14, which may be configured to be mounted to the exterior of the aircraft 100, 200, which is not shown in FIGS. 3 and 4.

The aircraft beacon light 2 further comprises a light redirecting element for redirecting stray light, passing through the light passing portions 6a, to the light detector 10. The light redirecting element 30 is configured to effect a redirection by between 80° and 100° for guiding the stray light towards the light detector 10. The light redirecting element 30 may have a v-shaped, rotationally symmetric reflector for directing the stray light towards the light detector 10. Said v-shaped, rotationally symmetric reflector may be arranged on light transmissive body, which spaces the reflector from the light detector 10. It may also be possible for the light detector 10 to be configured to have such a height that it can directly receive the stray light from the light passing portions 6a without intervention of the light redirecting element 30.

The aircraft beacon light 2 also comprises a light transmission cover 12 and a light detector cover 18. The light transmission cover 12 is supported by the base plate 14 and covers the annular arrangement of the light sources 4 and the optical element 20. The light transmission cover 12 may also be referred to as lens cover, as is customary in the aircraft lighting field. The light detector cover 18 is supported by the vertical support 16 and covers the control plate 8, so that no ambient light can reach the light detector 10 from above. In case the vertical support 16 is omitted, the light detector cover 18 may be supported by the light source support 6.

An operation of the aircraft beacon light 2 will be described below with reference to FIG. 3 and FIG. 4.

Each light source 4 has a main light emission direction 21, substantially orthogonal to the light source support 6. The main light emission direction 21 corresponds to the facing direction of each light source, namely to the direction straight away from the light source support 6. This direction is referred to as the main light emission direction 21, because it is the direction of the highest light intensity in the output light intensity distribution of each light source 4. The refractive outer surface portion 20a collimates the light from each light source 4. In particular, the refractive outer surface portion 20a collimates the light, emitted within an angular range of about +/−45° with respect to the main light emission direction 20, into an angular range of about +/−20° around the horizontal plane through the plurality of light sources 4. In this way, the refractive outer surface portion 20a may help to satisfy the high light intensity requirements for beacon light around the horizontal plane. The refracted light and some remaining un-refracted light form a radially outwards light emission, which satisfies the requirements for aircraft beacon light outputs.

Stray light, which is a portion of the light emitted by each light source 4 and is not relevant for the beacon light output, reaches the total internal reflection portion 20b. In particular, in the exemplary embodiment of FIG. 3, the stray light in question is light in an angular range of between −45° and −90° with respect to the main light emission direction 21. The stray light is not relevant for the beacon light output, because it is in a direction where it would be absorbed and/or reflected in an uncontrolled manner by the fuselage of the aircraft and/or by the base plate 14. Instead of said absorption/uncontrolled reflection, the stray light in question is used for the near end of life detection of the aircraft beacon light 2, as will be explained below.

The stray light experiences total internal reflection at the total internal reflection portion 20b, as is illustrated by exemplary light rays 7, and passes through the light passing portions 6a and the openings 16a to reach the light redirecting element 30. The light hitting the light redirecting element 30 is redirected by the light redirecting element 30 by between 80° and 100° to be guided to the light detector 10. The light detector 10, which is a photodetector, collects the redirected light and provides sensor measurement outputs, i.e. light output levels to the controller 40.

The controller 40 controls an operation of the plurality of light sources 4 and evaluates the light output levels, provided by the light detector 10, to determine a health status, i.e. an aging status, of the aircraft beacon light 2. This may be achieved in various ways. In particular, the controller 40 may store the light output levels in a memory (not shown) and compare them with a threshold value, which may be a certain percentage of a reference value. Based on the comparison, i.e. in a situation where the light output level is below the threshold value, the controller 40 may determine that the aircraft beacon light is to be serviced or replaced. In particular the controller 40 may determined that the light sources 4 need to be replaced with new ones. Such evaluation can be made with respect to individual light sources 4, with respect to subsets of the plurality of light sources 4, or with respect to the entire set of light sources 4. Particularly, the controller 40 may turn on the light sources 4 individually, may turn on a subset of the light sources 4, or may turn on the entire set of light sources 4 repeatedly over time for the evaluation purpose. Based upon the light output levels detected by the light detector 10, the controller 40 is able to determine an aging status of the individual light source 4, of the subset of the light sources 4, or of the entire set of light sources 4, respectively.

According to exemplary embodiments of the invention, a health status of a large number of light sources 4 of the aircraft beacon light 2 can be monitored by using a single light detector 10, resulting in low complexity and cost. Also, the evaluation accuracy can be enhanced by preventing all of or a large amount of ambient light from reaching the light detector 10, especially by making the light passing portions 6a with a plurality of through holes of appropriate dimensions.

Figure 5:
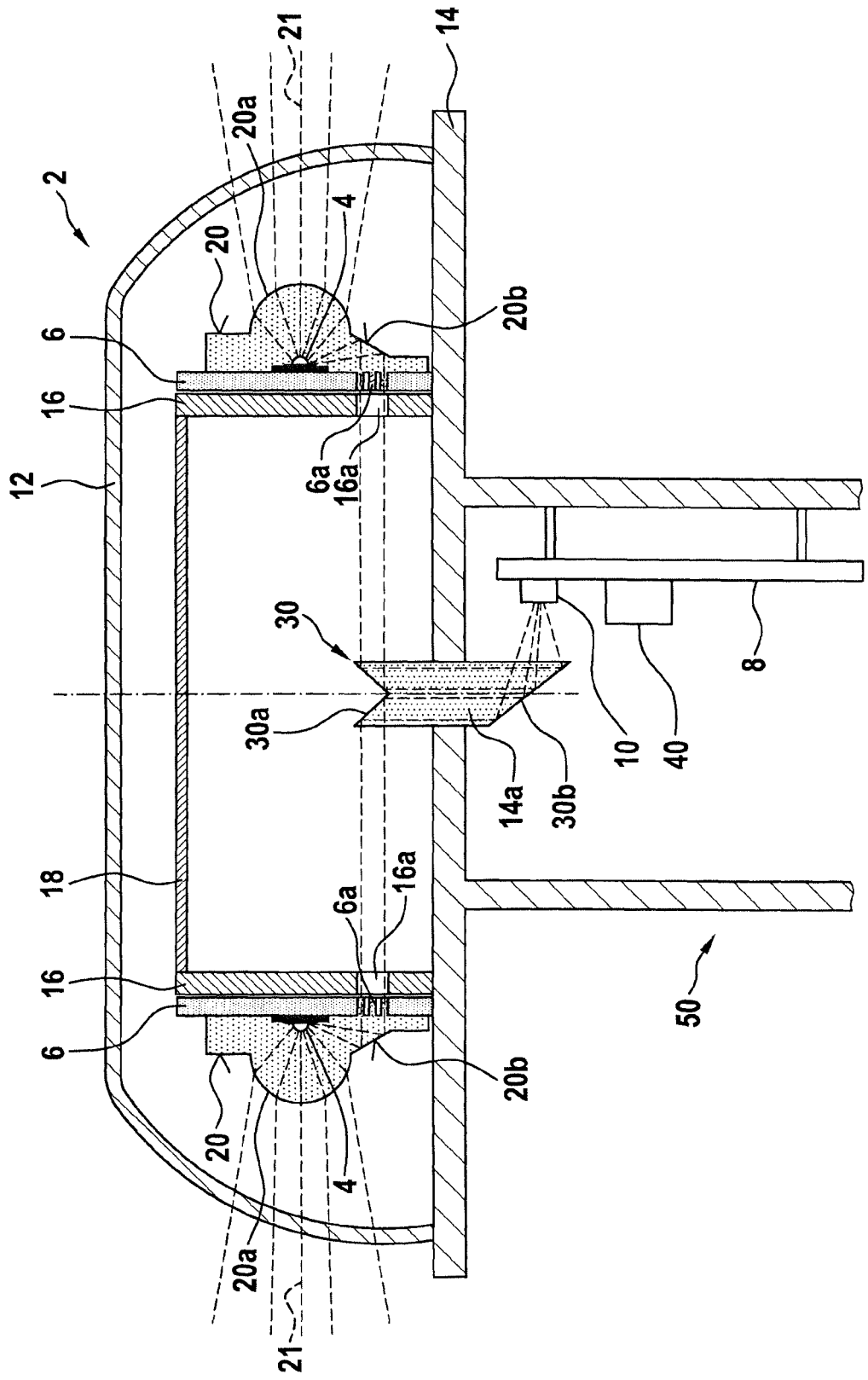
FIG. 5 depicts a cross-sectional view of an aircraft beacon light according to another exemplary embodiment of the invention.

FIG. 5 depicts a cross-sectional view of an aircraft beacon light according to another exemplary embodiment of the invention.

The embodiment of FIG. 5 differs from that of FIG. 3 and FIG. 4 in that it further comprises a housing 50 on an opposite side of the light source plate 6 with respect to the base plate 14 and in that the control plate 8 is arranged inside the housing 50. The housing 50 may support the base plate 14, and the control plate 8 may be supported by the housing 50. The housing may be embedded into the aircraft skin or may form a stem of the aircraft beacon light 2, which stem may space the optical components from the aircraft skin for enhanced angular reach of the beacon light output.

The base plate 14 has a center hole 14a, through which the light redirecting element 30 extends inside the housing 50. The light redirecting element 30 comprises a first light redirecting surface 30a and a second light redirecting surface 30b. The first light redirecting surface 30a is shaped and embodied to redirect the stray light from the light passing portions 6a by between 80° and 100° through the center hole 14a of the base plate 14. The second light redirecting surface 30b is shaped and embodied to effect a second redirection by between 80° and 100° for guiding the stray light, passing through the center hole 14a of the base plate 14, to the light detector 10. The second light redirecting surface 30b may be a plane reflector. When the light detector 10 is arranged right below the light redirecting element 30 inside the housing 50, the second light redirecting surface 30b may be dispensable.

The operation of the aircraft beacon light 2 of FIG. 5 is very similar to that of FIG. 3 and FIG. 4. The most notable difference is that the stray light, passing through the light passing portions 6a, is redirected twice by the light redirecting element 30 to reach the light detector 10, which is placed inside the housing 50. In this way, ambient light can be prevented from reaching the light detector 10 in an even more effective manner, thereby enhancing the evaluation accuracy of the light detector 10.

Figure 6:
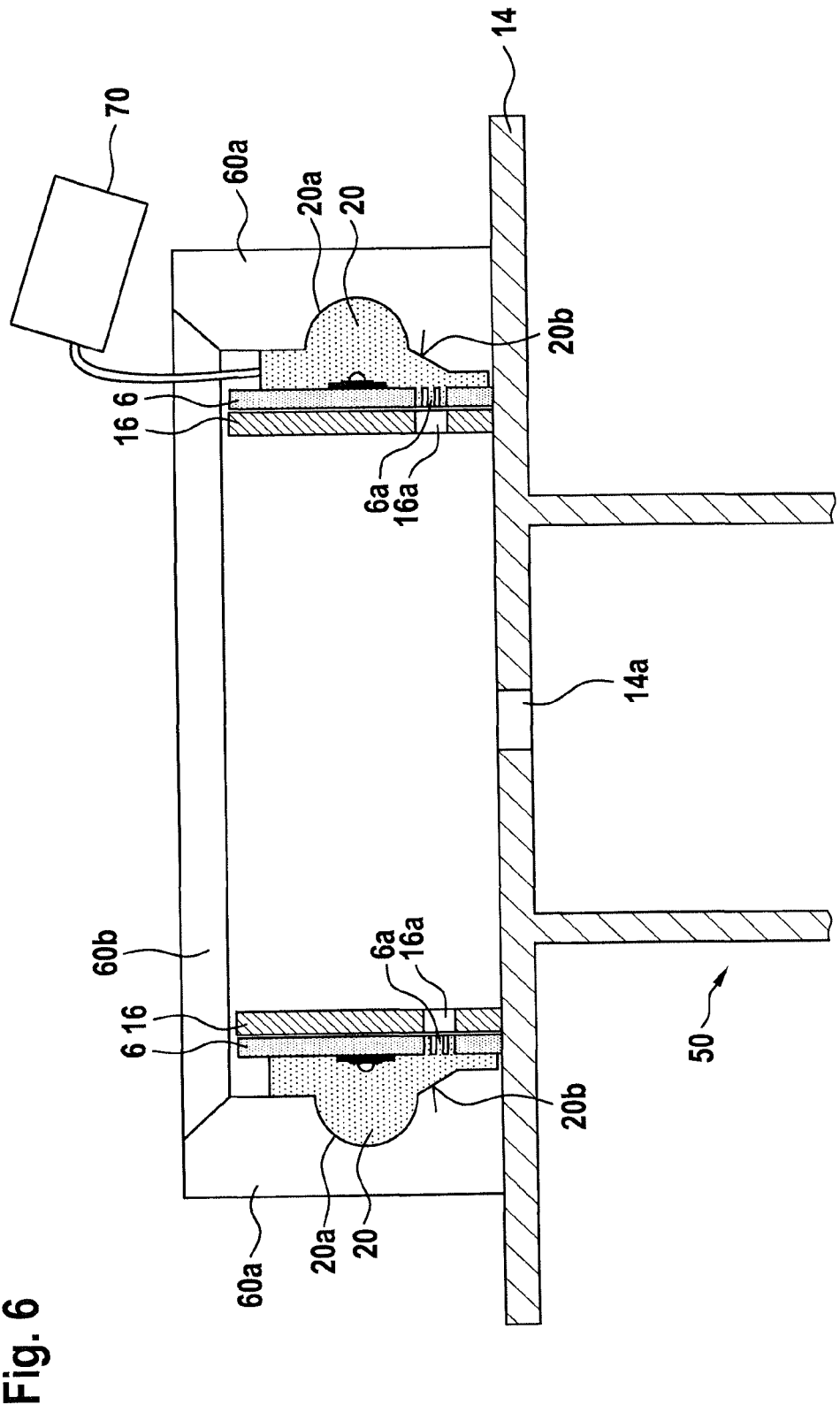
FIG. 6 depicts a diagram schematically illustrating an example of an overmolding process for manufacturing an optical element in the form of a unitary lens structure, as may be employed in an aircraft beacon light in accordance with an exemplary embodiment of the invention, from silicone.

FIG. 6 depicts a diagram schematically illustrating an example of an overmolding process for manufacturing an optical element in the form of a unitary lens structure, which may be employed in an aircraft beacon light in accordance with an exemplary embodiment of the invention, from silicone.

As shown in FIG. 6, a housing 50, a base plate 14 having a center hole 14a, an annular light source support 6 with light passing portions 6a, and an optional vertical support 16 with openings 16a are prepared. A plurality of light sources 4 are arranged on the light source support 6, which is a printed circuit board (PCB) having a plurality of vias at a portion corresponding to each of the light guiding portions 6a. Each of the plurality of vias has a diameter of between 0.2 mm and 0.4 mm. A first mold 60a is provided around the light source support 6 such that an inner space formed between the first mold 60a and the light source support 6 has a shape of the optical element 20 as explained above with reference to FIGS. 3-5. A second mold 60b is provided to cover the first mold 60a. Thereafter, silicone 70 is poured into the inner space between the first mold 60a and the light source support 6 to form the optical element 20 as a unity lens structure. The silicone 70 also fills into the plurality of vias of the light passing portions 6a of the light source support 6. Due to the capillary effect, however, the vias prevent the silicone 70 from seeping through the openings 16a of the vertical support 16 and thereby prevent the silicone 70 from flowing into an internal space formed by the light source support 6. In this way, the optical element 20, having the unitary lens structure, can be produced in an effective manner.

Figure 7:
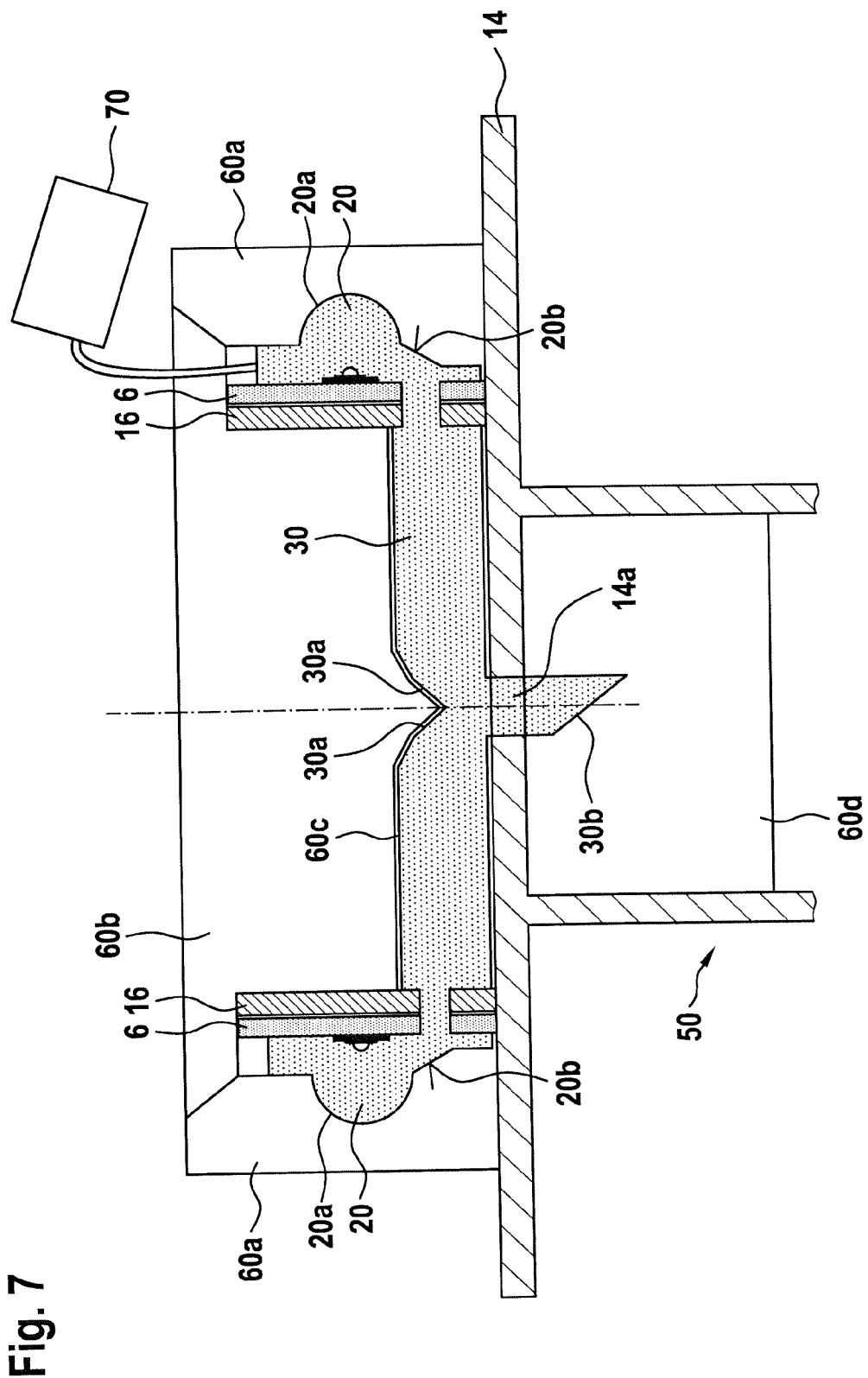
FIG. 7 depicts a diagram schematically illustrating another example of an overmolding process for manufacturing an optical element in the form of a unitary lens structure, as may be employed in an aircraft beacon light in accordance with an exemplary embodiment of the invention, from silicone.

FIG. 7 depicts a diagram schematically illustrating another example of an overmolding process for manufacturing an optical element in the form of a unitary lens structure, which may be employed in an aircraft beacon light in accordance with an exemplary embodiment of the invention, from silicone. In this example, both an optical element 20 a light redirecting element 30 are formed in the process of forming the unitary lens structure, based on the silicone overmolding process.

Compared to the mold set-up of FIG. 6, a mold structure of FIG. 7 further comprises a third mold 60c, which is provided inside the light source support 6 to form an upper part of the light redirecting element 30, and a fourth mold 60d, which is provided inside the housing 50 to form a lower part of the light redirecting element 30. In addition, each of the light passing portions 6a of the light source support 6 comprises a single through hole having a diameter of between 0.5 mm and 2.0 mm. Because the single through hole with such a dimension does not have the capillary effect, the silicone 70 can pass through the through holes 6a, 16a of the light source support 6 and the vertical support 16 and flow into a space formed by the third mold 60c, the base plate 14, and the fourth mold 60d. In this way, both the optical element 20 and the light redirecting element 30 can be formed as part of the unitary lens structure.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft beacon light, comprising:
    an annular light source support having a plurality of light passing portions;
    a plurality of light sources, arranged on the annular light source support for a radially outwards emission of light flashes;
    a light detector for sensing a light output level of at least a subset of the plurality of light sources; and
    at least one optical element for shaping a beacon light output from light emitted by the plurality of light sources, the at least one optical element having at least one light guiding portion for capturing stray light from at least said subset of the plurality of light sources and for guiding said stray light through the plurality of light passing portions and towards the light detector;
    wherein each of the plurality of light passing portions comprises a plurality of through holes through the annular light source support;
    wherein the aircraft beacon light further comprises a light redirecting element for redirecting the stray light from the plurality of light passing portions to the light detector.

2. The aircraft beacon light according to claim 1, wherein the light guiding portion comprises a total internal reflection portion, directing the stray light towards the plurality of light passing portions.

3. The aircraft beacon light according to claim 1, the at least one optical element is a lens structure, in particular a unitary lens structure encasing the plurality of light sources.

4. The aircraft beacon light according to claim 1, wherein each of the plurality of light passing portions has a one-to-one correspondence to each of the plurality of light sources.

5. The aircraft beacon light according to claim 1, wherein the annular light source support comprises at least one printed circuit board and wherein the plurality of through holes are vias through the at least one printed circuit board.

6. The aircraft beacon light according to claim 1, wherein the plurality of through holes each have a diameter of less than 0.5 mm.

7. The aircraft beacon light according to claim 1, wherein each of the plurality of light passing portions comprises a single through hole having a diameter greater than 0.5 mm.

8. The aircraft beacon light according to claim 1, wherein the plurality of light passing portions are filled with a filler material, such as silicone.

9. The aircraft beacon light according to claim 1, wherein the at least one optical element and at least part of the light redirecting element are formed in a joint molding operation, wherein the at least one optical element and at least part of the light redirecting element are in particular made from overmolded silicone.

10. The aircraft beacon light according to claim 1, further comprising:
    a housing with a support plate having a center hole;
    wherein the annular light source support extends from the support plate;
    wherein the light detector is arranged within the housing; and
    wherein the light redirecting element is configured to guide said stray light from the plurality of light passing portions through the center hole of the support plate and to the light detector.

11. The aircraft beacon light according to claim 10, wherein the light redirecting element is configured to effect a redirection by between 80° and 100° for guiding the stray light through the center hole of the support plate,
    wherein the light detector is in particular arranged on a circuit board placed inside the housing and wherein the light redirecting element is further configured to effect a second redirection by between 80° and 100° for guiding the stray light to the light detector.

12. An aircraft comprising:
    at least one aircraft beacon light according to claim 1, wherein the at least one aircraft beacon light is in particular mounted to a top portion of the aircraft and/or to a bottom portion of the aircraft.

* * * * *